(12) United States Patent
Ronchini Ximenes et al.

(10) Patent No.: US 12,146,965 B1
(45) Date of Patent: *Nov. 19, 2024

(54) AUTONOMOUS GATING SELECTION TO REDUCE NOISE IN DIRECT TIME-OF-FLIGHT DEPTH SENSING

(71) Applicant: Meta Platforms Technologies, LLC, Menlo Park, CA (US)

(72) Inventors: Augusto Ronchini Ximenes, Seattle, WA (US); Michael Hall, Bellevue, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 8 days.

This patent is subject to a terminal disclaimer.

(21) Appl. No.: 18/100,912

(22) Filed: Jan. 24, 2023

Related U.S. Application Data

(63) Continuation of application No. 16/826,209, filed on Mar. 21, 2020, now Pat. No. 11,585,937.

(Continued)

(51) Int. Cl.
*G01S 17/00* (2020.01)
*G01S 7/48* (2006.01)
(Continued)

(52) U.S. Cl.
CPC ............ *G01S 17/894* (2020.01); *G01S 7/483* (2013.01); *G01S 7/4863* (2013.01); *G01S 17/08* (2013.01); *G02B 27/017* (2013.01); *G02B 27/0172* (2013.01); *G06F 3/011* (2013.01); *G06T 7/50* (2017.01); *G06T 19/20* (2013.01); *H04N 13/254* (2018.05); *G01S 7/4865* (2013.01); *G01S 17/88* (2013.01); *G02B 2027/0138* (2013.01); *G04F 10/005* (2013.01); *G06T 2219/2004* (2013.01); *H04N 2013/0081* (2013.01); *H04S 7/304* (2013.01); *H04S 2400/11* (2013.01); *H04S 2400/15* (2013.01)

(58) Field of Classification Search
USPC ........................................................ 356/5.08
See application file for complete search history.

(56) References Cited

U.S. PATENT DOCUMENTS 11,091,169 B2 * 8/2021 Druml .................... G01S 7/4052
11,215,712 B2 * 1/2022 Ronchini Ximenes ......................
G01S 7/4863
(Continued)

FOREIGN PATENT DOCUMENTS

EP 3840363 A1 * 6/2021 ........... H01L 27/146

*Primary Examiner* — James R Hulka
(74) *Attorney, Agent, or Firm* — Freestone Intellectual Property Law PLLC; Aaron J. Visbeek

(57) ABSTRACT

A depth camera assembly (DCA) includes a direct time of flight system for determining depth information for a local area. The DCA includes an illumination source, a camera, and a controller. The illumination source projects light (e.g., pulse of light) into the local area. The camera detects reflections of the projected light from objects in the local area. Using an internal gating selection procedure, the controller selects a gate window that is likely to be associated with reflection of a pulse of light from an object. The selected gate may be used for depth determination. The internal gating selection procedures may be achieved through external target location and selection or through internal self-selection.

20 Claims, 9 Drawing Sheets

Related U.S. Application Data

(60) Provisional application No. 62/828,824, filed on Apr. 3, 2019.

(51) Int. Cl.
*G01S 7/483* (2006.01)
*G01S 7/4863* (2020.01)
*G01S 17/08* (2006.01)
*G01S 17/894* (2020.01)
*G02B 27/01* (2006.01)
*G06F 3/01* (2006.01)
*G06T 7/50* (2017.01)
*G06T 19/20* (2011.01)
*H04N 13/254* (2018.01)
*G01S 7/4865* (2020.01)
*G01S 17/88* (2006.01)
*G04F 10/00* (2006.01)
*H04N 13/00* (2018.01)
*H04S 7/00* (2006.01)

(56) References Cited

U.S. PATENT DOCUMENTS

| | | | |
|---|---|---|---|
| 11,480,684 B2* | 10/2022 | Ronchini Ximenes | ............... G01S 17/86 |
| 11,585,937 B2* | 2/2023 | Ronchini Ximenes | ............... G01S 17/42 |
| 2019/0291743 A1 | 9/2019 | Druml | |
| 2021/0333402 A1 | 10/2021 | Ronchini Ximenes et al. | |
| 2021/0396886 A1 | 12/2021 | Ronchini Ximenes et al. | |

* cited by examiner

AUTONOMOUS GATING SELECTION TO REDUCE NOISE IN DIRECT TIME-OF-FLIGHT DEPTH SENSING

CROSS-REFERENCE TO RELATED APPLICATIONS

This application is a continuation of co-pending U.S. application Ser. No. 16/826,209, filed Mar. 21, 2020, which claims the benefit of U.S. Provisional Application No. 62/828,824, filed Apr. 3, 2019, each of which is incorporated by reference in its entirety.

BACKGROUND

The present disclosure generally relates to depth sensing, and specifically relates reducing noise in depth sensing configuration using direct time of flight.

Mapping an environment with high accuracy and resolution allows generation or more immersive virtual reality (VR) or augmented reality (AR) content. Accurately mapping an environment surrounding a VR system or and AR system allows virtual objects to more realistically interact with real objects the environment surrounding the VR or AR system. For example, highly accurate mapping of an environment surrounding the VR or AR system allows a virtual object in a virtual environment to collide with real surfaces in the environment surrounding the VR or AR system or to appear occluded when the virtual object moves behind an opaque surface in the environment surrounding the VR or AR system.

SUMMARY

A depth camera assembly (DCA) determines depth information for one or more objects in a local area surrounding the DCA. In various embodiments, the DCA is included in a head mounted display (HMD) of a virtual reality system or of an augmented reality system. The DCA includes an illumination source, an imaging device, and a controller in various embodiments. Alternatively, the DCA is a separate device detached from the HMD.

To accurately map an environment surrounding a VR system or an AR system, the VR system or AR system includes a depth camera that has minimal image or algorithm artifacts. For inclusion in a head mounted display of a VR system or an AR system, such as depth camera should have a small form factor and low power consumption. Conventional depth cameras use structured light, which projects known patterns into the environment surrounding a depth camera, or indirect time of flight, which indirectly measures a round trip travel time of light projected into the environment surrounding the depth camera and returning to pixels on a sensor array based on a phase delay of an illumination pattern, such as a continuous wave illumination pattern or a pulsed illumination pattern, projected into the environment surrounding the depth camera.

Direct time-of-flight (dTOF) depth sensing configurations measure a roundtrip travel time of photons generated by multiple short pulses of light from an illumination source and synchronized with a detector. In many direct time-of-flight configurations, single-photon detectors are used, such as single-photon avalanche diodes (SPADs) are used. The depth to an object, or half of the travel distance, can then be extracted from the speed of light ($c \approx 3 \cdot 10^8$ m/s), according to $d = c/2 \cdot \tau$, where $\tau$ is the travel time. Direct time-of-flight allows multiple events (e.g., detections of photons) to be acquired in a histogram through a process called time-correlated single-photon counting (TCSPC), where the returning signal is accumulated around a charge accumulation bin coupled to detectors in a location corresponding to ae target location ($\tau_{target}$), while noise from internal and background illumination is uniformly distributed over the measurement range, which allows depth estimation under low signal to noise conditions.

Background noise influences depth sensing in direct time-of-flight configurations. To compensate for background noise, some configurations reduce a duty cycle of a depth sensor using a direct time-of-flight configuration. The duty cycle is a ratio between an exposure time of the depth sensor, which corresponds to a maximum, unambiguous measurement range, and a period that the illumination source emits light. To even further compensate for background noise, the depth sensor employs time gating, which disables the detector for photon detections that occur away from a target location through time gating, reducing noise based on a ratio of a difference in a time the detector is active and the time the detector is disabled to the exposure time of the depth sensor.

However, implementing time-gating often depends on prior knowledge of the target location, which can be difficult to obtain for low signal to noise ratio environments or for fast moving targets. Additionally, many detectors are two-dimensional arrays that likely image different targets in different locations, different time-gating is applied for different pixels of the array. Thus, conventional time-gating configurations consume significant amounts of power and risk detectors becoming saturated from potentially high activity. Further, conventional methods for determining target location are often very slow.

To more efficiently consume power while more quickly determining a target location, the illumination source is configured to illuminate the local area with outgoing light in accordance with emission instructions received from the controller. The illumination source comprises an illumination source and may include a beam steering assembly in various embodiments. The illumination source is configured to emit one or more optical beams. In some embodiments, the illumination source directly generates the one or more optical beams as polarized light, e.g., based on a polarizing element integrated into the illumination source or placed in front of the illumination source. In alternate embodiments, the illumination source generates the one or more optical beams as unpolarized light. In various embodiments, the beam steering assembly deflects the one or more optical beams to generate outgoing light having a relatively large angular spread based on the emission instructions. The relatively large angular spread allows the outgoing light to provide a wide field-of-view for scanning of the one or more objects in the local area. In some embodiments, the outgoing light comprises one or more outgoing light beams.

The imaging device is configured to capture, in accordance with receiving instructions from the controller, one or more images of the local area including reflected light including portions of the outgoing light reflected from objects in the local area. The reflected light captured by the imaging device is reflected from the one or more objects in the local area. In various embodiments, the imaging device comprises an imaging device including a detector that comprises a two dimensional array of pixels. However, in other embodiments, the imaging device includes a single detector or multiple detectors positioned relative to each other (e.g., a line of detectors). In various embodiments, each pixel includes a single photon avalanche diode (SPAD).

Different pixels of the array, or groups of pixels of the array, are coupled to a plurality of aggregators, with different switches coupling a pixel, or a group of pixels, to different aggregators. The imaging device generates, or receives, control signals that activate a specific switch that couples the pixel or the group of pixels to a time to digital converter (TDC) when the pixel or the group of pixels is coupled to a specific aggregator, but not when the pixel or the group of pixels is coupled to other aggregators. This allows the imaging device to generate a coarse histogram of light detected by a pixel or a group of pixels using incrementing of the aggregators over time. The resulting coarse histogram may be used to subsequently select time intervals when the pixel or the group of pixels is coupled to the TDC by coarsely identifying a target within the local area from which light emitted by the DCA was reflected based on the aggregators rather than timing information from the TDC.

The imaging device may internally generate control signals that activate a specific switch that couples the pixel or the group of pixels to the time to digital converter (TDC) at a specific time based on values of counters to which the pixel or group of pixels is coupled during different time intervals. In various embodiments, the imaging device couples the pixel or the group of pixels to different counters during different time intervals. A selector selects a counter having a maximum value and provides a control signal to a switch coupling the pixel or the group of pixels to the TDC during a time interval when the pixel or the group of pixels is also coupled to the counter having the maximum value. The imaging device determines that the counter having the maximum value corresponds to a location within the local area from which light emitted by the DCA was reflected. Time to digital conversion is performed during time intervals when the counter having the maximum value is coupled to the pixel, or the group of pixels, but not when the pixel or the group of pixels is coupled to other counters.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereoscopic, or "stereo," video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a headset, a head-mounted display (HMD) connected to a host computer system, a standalone HMD, a near-eye display (NED), a mobile device or computing system, or any other hardware platform capable of providing artificial reality content to one or more viewers.

System Environment

Figure 1:
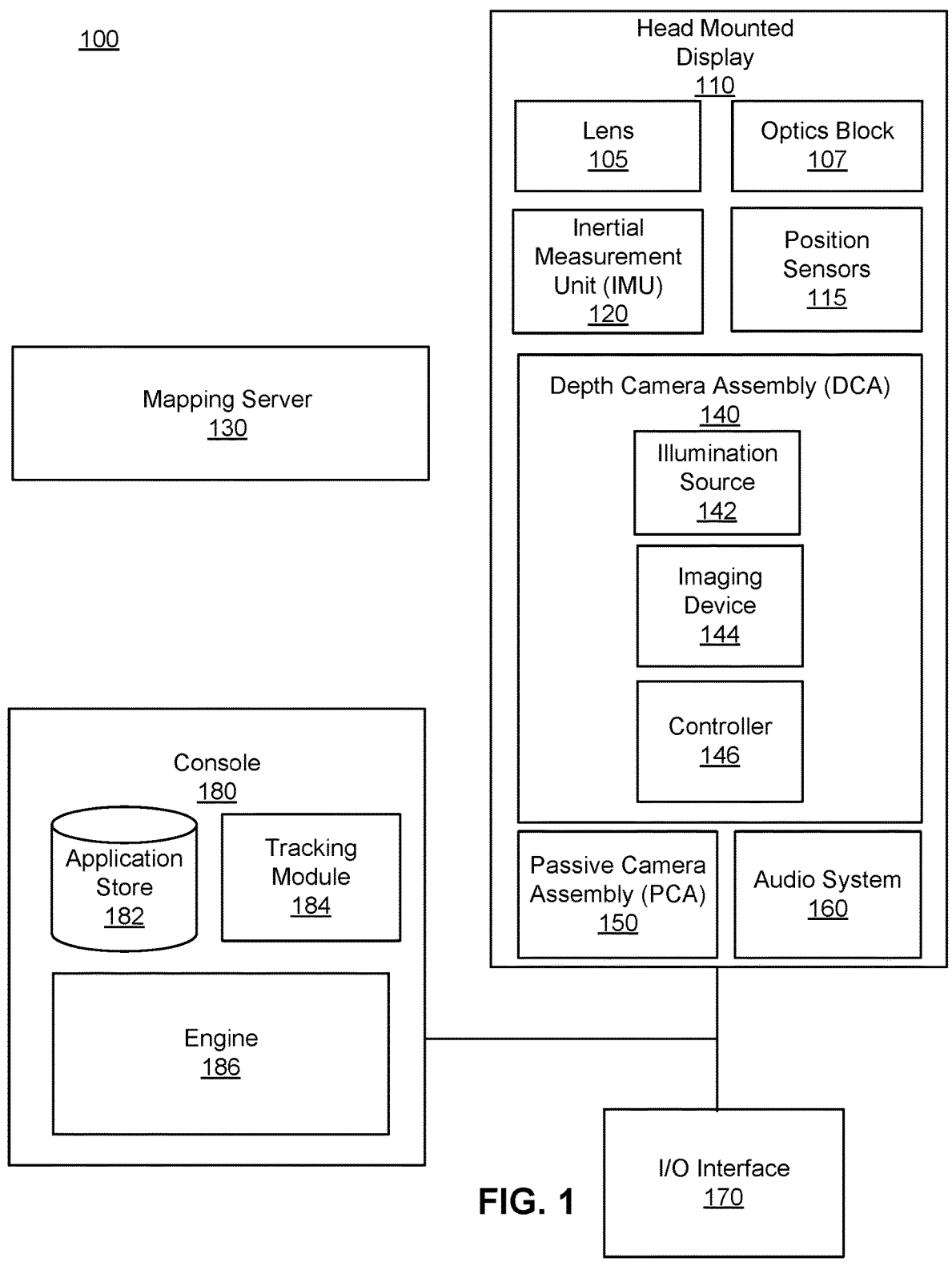
FIG. 1 is a block diagram of a system environment in which a console and a head mounted display (HMD) operate, in accordance with an embodiment.

FIG. 1 is a block diagram of one embodiment of a system environment 100 of a HMD 110. The system environment 100 may operate in an artificial reality environment, e.g., a virtual reality, an augmented reality, a mixed reality environment, or some combination thereof. The system 100 environment shown by FIG. 1 includes the HMD 110, a mapping server 130 and an input/output (I/O) interface 170 that is coupled to a console 180. While FIG. 1 shows an example system environment 100 including one HMD 110 and one I/O interface 180, in other embodiments any number of these components may be included in the system environment 100. For example, there may be multiple headsets 110 each having an associated I/O interface 170, with each HMD 110 and I/O interface 170 communicating with the console 180. In alternative configurations, different and/or additional components may be included in the system environment 100. Additionally, functionality described in conjunction with one or more of the components shown in FIG. 1 may be distributed among the components in a different manner than described in conjunction with FIG. 1 in some embodiments. For example, some or all of the functionality of the console 180 may be provided by the HMD 110.

The HMD 110 includes a lens 105, an optics block 107, one or more position sensors 115, an inertial measurement unit (IMU) 120, a depth camera assembly (DCA) 140 a passive camera assembly (PCA) 150, and an audio system 160. Some embodiments of the HMD 110 have different components than those described in conjunction with FIG. 1. Additionally, the functionality provided by various components described in conjunction with FIG. 1 may be differently distributed among the components of the HMD 110 in other embodiments, or be captured in separate assemblies remote from the HMD 110.

The lens 105 may include an electronic display that displays 2D or 3D images to the user in accordance with data received from the console 180. In various embodiments, the lens 105 comprises a single electronic display or multiple electronic displays (e.g., a display for each eye of a user). Examples of an electronic display include: a liquid crystal display (LCD), an organic light emitting diode (OLED) display, an active-matrix organic light-emitting diode display (AMOLED), some other display, or some combination thereof.

The optics block 107 magnifies image light received from the electronic display, corrects optical errors associated with the image light, and presents the corrected image light to a user of the HMD 110. In various embodiments, the optics block 107 includes one or more optical elements. Example optical elements included in the optics block 107 include: an aperture, a Fresnel lens, a convex lens, a concave lens, a filter, a reflecting surface, or any other suitable optical element that affects image light. Moreover, the optics block 107 may include combinations of different optical elements. In some embodiments, one or more of the optical elements in the optics block 107 may have one or more coatings, such as partially reflective or anti-reflective coatings.

Magnification and focusing of the image light by the optics block 107 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases all, of the user's field of view. Additionally, in some embodiments, the amount of magnification may be adjusted by adding or removing optical elements.

In some embodiments, the optics block 107 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 107 corrects the distortion when it receives image light from the electronic display generated based on the content.

The IMU 120 is an electronic device that generates data indicating a position of the HMD 110 based on measurement signals received from one or more of the position sensors 115. A position sensor 115 generates one or more measurement signals in response to motion of the HMD 110. Examples of position sensors 115 include: one or more accelerometers, one or more gyroscopes, one or more magnetometers, another suitable type of sensor that detects motion, a type of sensor used for error correction of the IMU 120, or some combination thereof. The position sensors 115 may be located external to the IMU 120, internal to the IMU 120, or some combination thereof.

The DCA 140 generates depth image data of a local area, such as a room. Depth image data includes pixel values defining distance from the DCA 140, providing a mapping of locations captured in the depth image data, such as a three-dimensional mapping of locations captured in the depth image data. The DCA 140 includes an illumination source 142, an imaging device 144, and a controller 146. The illumination source 142 may project a structured light pattern or other light that is reflected off objects in the local area, and captured by the imaging device 144 or by the additional imaging device 146 to generate the depth image data.

For example, the illumination source 142 may project a plurality of structured light (SL) elements of different types (e.g. lines, grids, or dots) onto a portion of a local area surrounding the HMD 110. In various embodiments, the illumination source 142 comprises an emitter and a pattern plate. The emitter is configured to illuminate the pattern plate with light (e.g., infrared light). The illuminated pattern plate projects a structured light (SL_pattern comprising a plurality of SL elements into the local area. For example, each of the SL elements projected by the illuminated pattern plate is a dot associated with a particular location on the pattern plate.

Each SL element projected by the DCA 140 comprises light in the infrared light part of the electromagnetic spectrum. In some embodiments, the illumination source is a laser configured to illuminate a pattern plate with infrared light such that it is invisible to a human. In some embodiments, the illumination source may be pulsed. In some embodiments, the illumination source may be visible and pulsed such that the light is not visible to the eye.

The SL pattern projected into the local area by the DCA 140 deforms as it encounters various surfaces and objects in the local area. The imaging device 144 is configured to capture one or more images of the local area. Each of the one or more images captured may include a plurality of SL elements (e.g., dots) projected by the illumination source 142 and reflected by the objects in the local area. The imaging device 144 may be a detector array, a camera, or a video camera.

The imaging device 144 includes a detector, as further described below in conjunction with FIGS. 5-11. In various embodiments, the detector includes circuitry that performs time gating on pixels of the detector to disable detection events away from a target location in the local area from which light from the illumination source 142 is reflected in the local area. This selective disabling of pixels of the detector reduces an amount of background light (i.e., detected light that is not emitted by the illumination source 142). Including circuitry in the detector, as further described below in conjunction with FIGS. 6-11, reduces power consumption by the imaging device 144 and increases a signal to noise ratio of timing information describing capture of light emitted by the illumination source 142, reflected by one or more objects in the local area, and captured by the imaging device 144.

The controller of the DCA 140 is coupled to the illumination source 142 and to the imaging device 144 and is configured to generate emission instructions for the illumination source 142. The controller of the DCA 140 provides the emission instructions components of the illumination source 142 to direct light emitted by the illumination source 142. Additionally, the controller 146 receives information from the imaging device 144 identifying a digital timestamp when the imaging device 144 detected light from the illumination source 142 reflected by one or more objects in the local area. From the digital timestamp and a time when the illumination source 142 emitted light into the local area, the controller 146 determines a distance from the DCA 140 to objects in the local area. In some embodiments, the DCA 140 identifies an object, or other target, in the local area and provides control signals to the imaging device 144 that identify time intervals when the imaging device 144 determines digital timestamps for detected light, as further described below in conjunction with FIGS. 6-8.

The PCA 150 includes one or more passive cameras that generate color (e.g., RGB) image data. Unlike the DCA 140 that uses active light emission and reflection, the PCA 150 captures light from the environment of a local area to generate image data. Rather than pixel values defining depth or distance from the imaging device, the pixel values of the image data may define the visible color of objects captured in the imaging data. In some embodiments, the PCA 150 includes a controller that generates the color image data based on light captured by the passive imaging device. In some embodiments, the DCA 140 and the PCA 150 share a common controller. For example, the common controller may map each of the one or more images captured in the visible spectrum (e.g., image data) and in the infrared spectrum (e.g., depth image data) to each other. In one or more embodiments, the common controller is configured to, additionally or alternatively, provide the one or more images of the local area to the audio system 160, to the console 180, or to any other suitable components.

The audio system 160 presents audio content to a user of the HMD 110 using a set of acoustic parameters representing an acoustic property of a local area where the HMD 110 is located. The audio system 160 presents the audio content to appear originating from an object (e.g., virtual object or real object) within the local area. The audio system 160 may obtain information describing at least a portion of the local area. In some embodiments, the audio system 160 may communicate the information to the mapping server 130 for determination of the set of acoustic parameters at the mapping server 130. The audio system 160 may also receive the set of acoustic parameters from the mapping server 130.

In some embodiments, the audio system 160 selectively extrapolates the set of acoustic parameters into an adjusted set of acoustic parameters representing a reconstructed impulse response for a specific configuration of the local area, responsive to a change of an acoustic condition of the local area being above a threshold change. The audio system 160 may present audio content to the user of the HMD 110 based at least in part on the reconstructed impulse response.

In some embodiments, the audio system 160 monitors sound in the local area and generates a corresponding audio stream. The audio system 160 may adjust the set of acoustic parameters, based at least in part on the audio stream. The audio system 160 may also selectively communicate the audio stream to the mapping server 130 for updating a virtual model describing a variety of physical spaces and acoustic properties of those spaces, responsive to determination that a change of an acoustic property of the local area over time is above a threshold change. The audio system 160 of the HMD 110 and the mapping server 130 may communicate via a wired or wireless communication channel.

The I/O interface 170 is a device that allows a user to send action requests and receive responses from the console 180. An action request is a request to perform a particular action. For example, an action request may be an instruction to start or end capture of image or video data, or an instruction to perform a particular action within an application. The I/O interface 170 may include one or more input devices. Example input devices include: a keyboard, a mouse, a game controller, or any other suitable device for receiving action requests and communicating the action requests to the console 180. An action request received by the I/O interface 170 is communicated to the console 180, which performs an action corresponding to the action request. In some embodiments, the I/O interface 170 includes the IMU 120, as further described above, that captures calibration data indicating an estimated position of the I/O interface 170 relative to an initial position of the I/O interface 170. In some embodiments, the I/O interface 170 may provide haptic feedback to the user in accordance with instructions received from the console 180. For example, haptic feedback is provided when an action request is received, or the console 180 communicates instructions to the I/O interface 170 causing the I/O interface 170 to generate haptic feedback when the console 180 performs an action.

The console 180 provides content to the HMD 110 for processing in accordance with information received from one or more of: the DCA 140, the PCA 150, the HMD 110, and the I/O interface 170. In the example shown in FIG. 1, the console 180 includes an application store 182, a tracking module 184, and an engine 186. Some embodiments of the console 180 have different modules or components than those described in conjunction with FIG. 1. Similarly, the functions further described below may be distributed among components of the console 180 in a different manner than described in conjunction with FIG. 1. In some embodiments, the functionality discussed herein with respect to the console 180 may be implemented in the HMD 110, or a remote system.

The application store 182 stores one or more applications for execution by the console 180. An application is a group of instructions, that when executed by a processor, generates content for presentation to the user. Content generated by an application may be in response to inputs received from the user via movement of the HMD 110 or the I/O interface 170. Examples of applications include: gaming applications, conferencing applications, video playback applications, or other suitable applications.

The tracking module 184 calibrates the local area of the system environment 100 using one or more calibration parameters and may adjust one or more calibration parameters to reduce error in determination of the position of the HMD 110 or of the I/O interface 170. For example, the tracking module 184 communicates a calibration parameter to the DCA 140 to adjust the focus of the DCA 140 to more accurately determine positions of SL elements captured by the DCA 140. Calibration performed by the tracking module 184 also accounts for information received from the IMU 120 in the HMD 110 and/or an IMU 120 included in the I/O interface 640. Additionally, if tracking of the HMD 110 is lost (e.g., the DCA 140 loses line of sight of at least a threshold number of the projected SL elements), the tracking module 184 may re-calibrate some or all of the system environment 100.

The tracking module 184 tracks movements of the HMD 110 or of the I/O interface 170 using information from the DCA 140, the PCA 150, the one or more position sensors 115, the IMU 120 or some combination thereof. For example, the tracking module 184 determines a position of a reference point of the HMD 110 in a mapping of a local area based on information from the HMD 110. The tracking module 184 may also determine positions of an object or virtual object. Additionally, in some embodiments, the tracking module 184 may use portions of data indicating a position of the HMD 110 from the IMU 120 as well as representations of the local area from the DCA 140 to predict a future location of the HMD 110. The tracking module 184 provides the estimated or predicted future position of the HMD 110 or the I/O interface 170 to the engine 186.

The engine 186 executes applications and receives position information, acceleration information, velocity information, predicted future positions, or some combination thereof, of the HMD 110 from the tracking module 184. Based on the received information, the engine 186 determines content to provide to the HMD 110 for presentation to the user. For example, if the received information indicates that the user has looked to the left, the engine 186 generates content for the HMD 110 that mirrors the user's movement in a virtual local area or in a local area augmenting the local area with additional content. Additionally, the engine 186 performs an action within an application executing on the console 180 in response to an action request received from the I/O interface 170 and provides feedback to the user that the action was performed. The provided feedback may be visual or audible feedback via the HMD 110 or haptic feedback via the I/O interface 170.

Head Mounted Display

Figure 2:
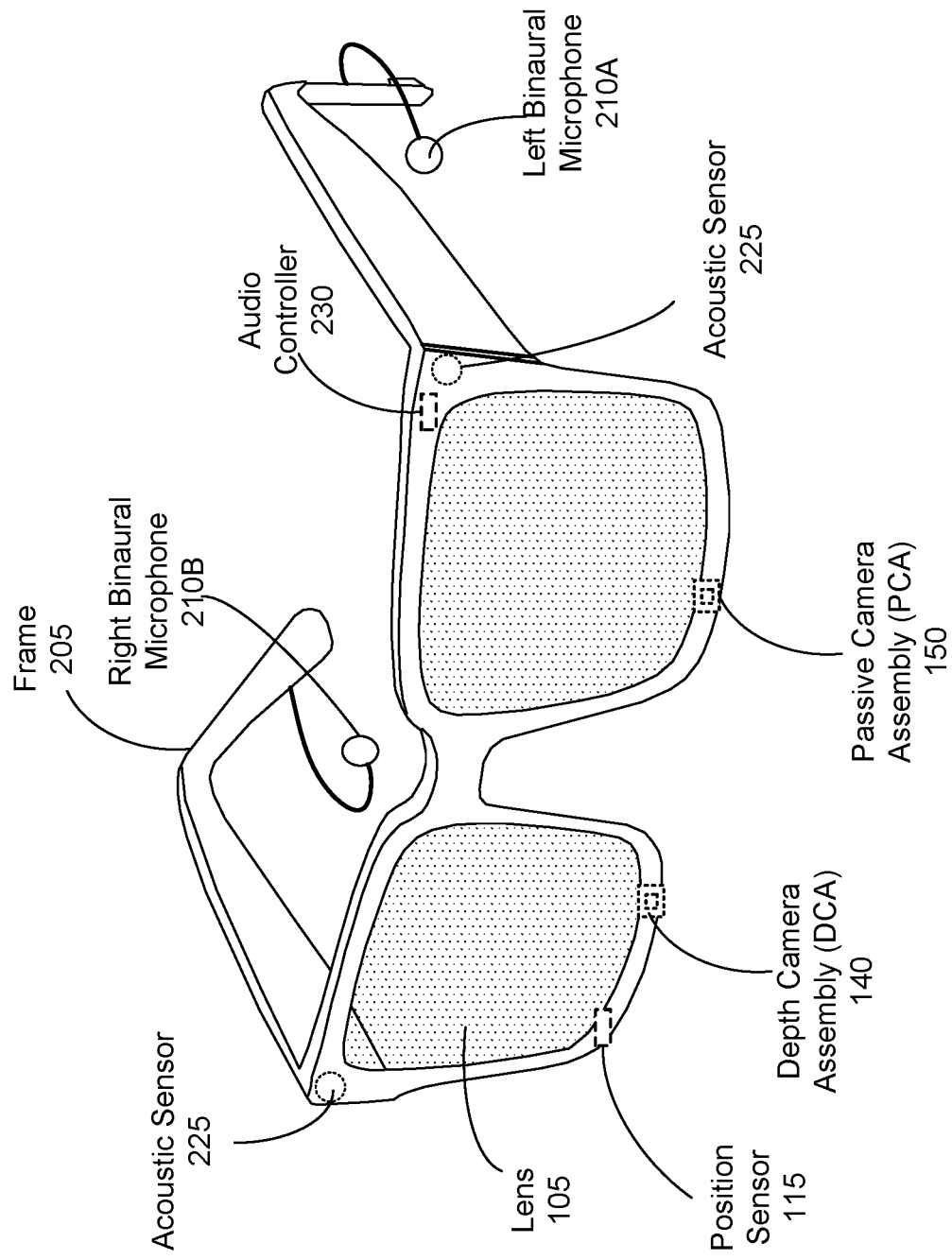
FIG. 2 is a diagram of a head-mounted display (HMD), in accordance with an embodiment.

FIG. 2 is a perspective view of the head mounted display (HMD) 110, in accordance with one or more embodiments. In some embodiments (as shown in FIG. 1), the HMD 110 is implemented as a NED. In alternate embodiments (not shown in FIG. 1), the headset 100 is implemented as an HMD. In general, the HMD 110 may be worn on the face of a user such that content (e.g., media content) is presented using one or both lenses 105 of the HMD 110. However, the HMD 110 may also be used such that media content is presented to a user in a different manner. Examples of media content presented by the HMD 110 include one or more images, video, audio, or some combination thereof. The HMD 110 may include, among other components, a frame 205, a lens 105, a DCA 140, a PCA 150, a position sensor 115, and an audio system 160. The audio system of the HMD 110 shown in FIG. 2 includes a left binaural microphone 210a, a right binaural microphone 210b, an array of acoustic sensors 225, an audio controller 230, one or more other components, or combination thereof. The audio system of the HMD 110 is an embodiment of the audio system 160 described above in conjunction with FIG. 1. The DCA 140 and the PCA 150 may be part of SLAM sensors mounted the HMD 110 for capturing visual information of a local area surrounding some or all of the HMD 110. While FIG. 2 illustrates the components of the HMD 110 in example locations on the HMD 110, the components may be located elsewhere on the HMD 110, on a peripheral device paired with the HMD 110, or some combination thereof.

The HMD 110 may correct or enhance the vision of a user, protect the eye of a user, or provide images to a user. The HMD 110 may be eyeglasses which correct for defects in a user's eyesight. The HMD 110 may be sunglasses which protect a user's eye from the sun. The HMD 110 may be safety glasses which protect a user's eye from impact. The HMD 110 may be a night vision device or infrared goggles to enhance a user's vision at night. The HMD 110 may be a near-eye display that produces artificial reality content for the user.

The frame 205 holds the other components of the HMD 110. The frame 205 includes a front part that holds the lens 105 and end pieces to attach to a head of the user. The front part of the frame 205 bridges the top of a nose of the user. The end pieces (e.g., temples) are portions of the frame 205 to which the temples of a user are attached. The length of the end piece may be adjustable (e.g., adjustable temple length) to fit different users. The end piece may also include a portion that curls behind the ear of the user (e.g., temple tip, ear piece).

The lens 105 provides or transmits light to a user wearing the HMD 110. The lens 105 may be prescription lens (e.g., single vision, bifocal and trifocal, or progressive) to help correct for defects in a user's eyesight. The prescription lens transmits ambient light to the user wearing the HMD 110. The transmitted ambient light may be altered by the prescription lens to correct for defects in the user's eyesight. The lens 105 may be a polarized lens or a tinted lens to protect the user's eyes from the sun. The lens 105 may be one or more waveguides as part of a waveguide display in which image light is coupled through an end or edge of the waveguide to the eye of the user. The lens 105 may include an electronic display for providing image light and may also include an optics block for magnifying image light from the electronic display, as further described above in conjunction with FIG. 1.

The DCA 140 captures depth image data describing depth information for a local area surrounding the HMD 110, such as a room. In some embodiments, the DCA 140 may include a light projector 142 (e.g., structured light and/or flash illumination for time-of-flight), a plurality of imaging devices (e.g., the imaging device 144 and the additional imaging device 146 in FIG. 1) plurality, and a controller 148, as described above in conjunction with FIG. 1. The captured data may be images captured by the imaging device of light projected onto the local area by the light projector. In one embodiment, the DCA 140 may include a controller and two or more imaging devices (e.g., cameras) that are oriented to capture portions of the local area in stereo. The captured data may be images captured by the two or more imaging devices of the local area in stereo. The controller of the DCA 140 computes the depth information of the local area using the captured data and depth determination techniques (e.g., structured light, time-of-flight, stereo imaging, etc.). Based on the depth information, the controller 148 of the DCA 140 determines absolute positional information of the HMD 110 within the local area. The controller 148 of the DCA 140 may also generate a model of the local area. The DCA 140 may be integrated with the HMD 110 or may be positioned within the local area external to the HMD 110. In some embodiments, the controller 148 of the DCA 140 may transmit the depth image data to the mapping server 130 via a network or other communication channel.

The PCA 150 includes one or more passive cameras that generate color (e.g., RGB) image data. Unlike the DCA 140 that uses active light emission and reflection, the PCA 150 captures light from the environment of a local area to generate color image data. Rather than pixel values defining depth or distance from the imaging device, pixel values of the color image data may define visible colors of objects captured in the image data. In some embodiments, the PCA 150 includes a controller that generates the color image data based on light captured by the passive imaging device. The PCA 150 may provide the color image data to the controller 148 of the DCA 140 for further processing or for communication to the mapping server 130.

The array of acoustic sensors 225 monitor and record sound in a local area surrounding some or all of the HMD 110. As illustrated in FIG. 2, the array of acoustic sensors 225 include multiple acoustic sensors with multiple acoustic detection locations that are positioned on the HMD 110. The array of acoustic sensors 225 may provide the recorded sound as an audio stream to the audio controller 230.

The position sensor 115 generates one or more measurement signals in response to motion of the HMD 110. The position sensor 115 may be located on a portion of the frame 205 of the HMD 110. The position sensor 115 may include a position sensor, an inertial measurement unit (IMU), or both. Some embodiments of the HMD 110 may or may not include the position sensor 115 or may include more than one position sensors 115. In embodiments in which the position sensor 115 includes an IMU, the IMU generates IMU data based on measurement signals from the position sensor 115. Examples of position sensor 115 include: one or more accelerometers, one or more gyroscopes, one or more magnetometers, another suitable type of sensor that detects motion, a type of sensor used for error correction of the IMU, or some combination thereof. The position sensor 115 may be located external to the IMU, internal to the IMU, or some combination thereof.

Based on the one or more measurement signals, the position sensor 115 estimates a current position of the HMD 110 relative to an initial position of the HMD 110. The estimated position may include a location of the HMD 110 and/or an orientation of the HMD 110 or the user's head wearing the HMD 110, or some combination thereof. The orientation may correspond to a position of each ear relative to a reference point. In some embodiments, the position sensor 115 uses the depth information and/or the absolute positional information from the DCA 140 to estimate the current position of the HMD 110. The position sensor 115 may include multiple accelerometers to measure translational motion (forward/back, up/down, left/right) and multiple gyroscopes to measure rotational motion (e.g., pitch, yaw, roll). In some embodiments, an IMU, further described above in conjunction with FIG. 1, rapidly samples the measurement signals and calculates the estimated position of the HMD 110 from the sampled data. For example, the IMU integrates the measurement signals received from the accelerometers over time to estimate a velocity vector and integrates the velocity vector over time to determine an estimated position of a reference point on the HMD 110. The reference point is a point that may be used to describe the position of the HMD 110. While the reference point may generally be defined as a point in space, however, in practice the reference point is defined as a point within the HMD 110.

The audio controller 230 provides audio instructions to one or more speakers for generating sound by generating audio content using a set of acoustic parameters (e.g., a room impulse response). The audio controller 230 presents the audio content to appear originating from an object (e.g., virtual object or real object) within the local area, e.g., by transforming a source audio signal using the set of acoustic parameters for a current configuration of the local area. The audio controller 230 receives information describing a sound pressure in an ear canals of the user when speakers of the HMD 110 are presenting audio data to the user from binaural microphone 210A and binaural microphone 210B. Based on the information from the binaural microphones 210A, 210B the audio controller 2230 calibrates one or more speakers, which receive audio instructions from the audio controller 230 to generate sounds. For example, a left speaker obtains a left audio channel from the audio controller 230, and a right speaker obtains and a right audio channel from the audio controller 230. In various embodiments, each speaker is coupled to an end piece of the frame 205, although in other embodiments the speakers, or a speaker array, are integrated into the frame 205 (e.g., in temples of the frame 205) to improve directionality of presented audio content.

The audio controller 230 may obtain visual information describing at least a portion of the local area, e.g., from the DCA 140 and/or the PCA 150. The visual information obtained at the audio controller 230 may include depth image data captured by the DCA 140. The visual information obtained at the audio controller 230 may further include color image data captured by the PCA 150. The audio controller 230 may combine the depth image data with the color image data into the visual information that is communicated (e.g., via a communication module coupled to the audio controller 230, not shown in FIG. 2) to the mapping server 130 for determination of a set of acoustic parameters. In one embodiment, the communication module (e.g., a transceiver) may be integrated into the audio controller 230. In another embodiment, the communication module may be external to the audio controller 230 and integrated into the frame 205 as a separate module coupled to the audio controller 230. In some embodiments, the audio controller 230 generates an audio stream based on sound in the local area monitored by, e.g., the array of acoustic sensors 225. The communication module coupled to the audio controller 230 may selectively communicate the audio stream to the mapping server 130 for updating the visual model of physical spaces at the mapping server 130.

Depth Camera Assembly

Figure 3:
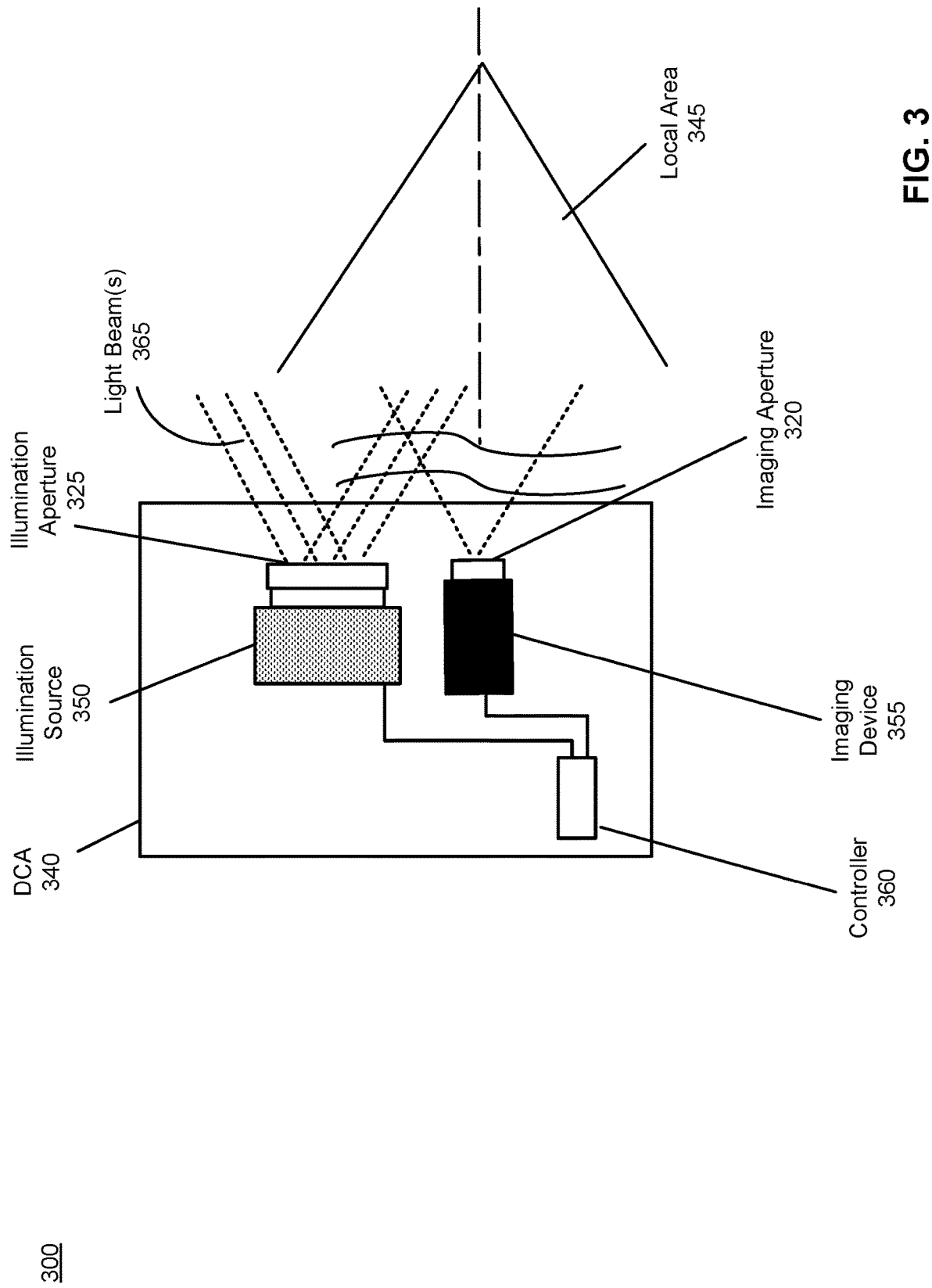
FIG. 3 is a cross section of a front rigid body of the head mounted display (HMD) in FIG. 2, in accordance with an embodiment.

FIG. 3 is block diagram of one embodiment of a depth camera assembly (DCA) 340, such as the DCA 140 shown in FIG. 1. In other embodiments, the DCA 340 includes different or additional components than those shown in FIG. 3. Further, in some embodiments, the DCA 340 combines functionalities of one or more components shown in FIG. 3 into fewer components.

The DCA 340 for determines depth information of one or more objects in a local area 345 surrounding some or all of the HMD 110. The DCA 340 includes an illumination source 350, an imaging device 355, and a controller 360 that may be coupled to both the illumination source 350 and to the imaging device 355. The illumination source 350 emits one or more light beams 365 through the illumination aperture 325. The illumination source 350 illuminates the local area 345 with the one or more light beams 365 in accordance with emission instructions generated by the controller 360. The illumination source 350 can be part of an illumination source of a beam steering assembly incorporated into the DCA 340, as further described in conjunction with FIG. 4.

The illumination source 350 may include a plurality of emitters that each emits light having certain characteristics (e.g., wavelength, polarization, coherence, pulse width, temporal behavior, etc.). Various emitters may have common characteristics or different characteristics, and the emitters can be operated simultaneously or individually. Example emitters include laser diodes (e.g., edge emitters), inorganic or organic light emitting diodes (LEDs), a vertical-cavity surface-emitting laser (VCSEL), or some other source. In some embodiments, a single emitter or a plurality of emitters in the illumination source 350 can emit the one or more light beams 365 that form a structured light pattern, e.g., a dot pattern. In some embodiments, the illumination source 350 includes a laser diode (e.g., infrared laser diode) and a polarizing element for generating the one or more light beams 365 as polarized light.

The imaging device 355 is configured to capture portions of the one or more light beams 365 reflected from the local area 345 through the imaging aperture 320. The imaging device 355 includes a detector (not shown in FIG. 3)

implemented as a dense array of single photon avalanche diode (SPAD) pixels, as further described below in conjunction with FIGS. 5-11. The imaging device 355 may also include a polarization sensitive photodetector that uses, e.g., optically anisotropic materials to detect photons of a specific polarization, e.g., linear, circular, elliptical, etc. The imaging device 355 captures one or more images of one or more objects in the local area 345 illuminated with the one or more light beams 365. In various embodiments, the imaging device 355 has a focus that spreads captured light across a subset of the multiple SPAD pixels; hence, a point spread function of the imaging device 355 spreads light captured by the imaging device 355 across multiple SPAD pixels, creating a region of interest comprising the SPAD pixels onto which the imaging device 355 directs captured light; hence, the region of interest comprises a subset of the SPAD pixels included in the detector. In the preceding example, a size of the region of interest of SPAD pixels is determined based on an expected maximum or minimum range of the DCA 340 so the region of interest of SPAD pixels is sufficient for analog signal processing or digital histogram processing.

The controller 360 may control operation of certain components of the illumination source 350, based on the emission instructions. In some embodiments, the controller 360 may provide the emission instructions to a fine steering element (not shown in FIG. 3) and/or a coarse steering element (not shown in FIG. 3), within the illumination source 350 to control a field-of-view of the local area 345 illuminated by the one or more light beams 365. Additionally, the controller 360 is coupled to the imaging device 355 and provides control signals to a detector of the imaging device 355 identifying time intervals when the imaging device 355 generates digital timestamps identifying times when the imaging device 345 detected light from the illumination source 350 reflected by one or more objects in the local area, as further described below in conjunction with FIGS. 6-11. From a time when the illumination source 350 emitted light into the local area 345 and one or more digital timestamps from the imaging device 355 identifying times when the imaging device 355 detected light emitted by the illumination source 350 and reflected from one or more objects in the local area 345.

The controller 360 is configured to determine depth information for the one or more objects in the local area 345 based at least in part on the captured portions of the one or more reflected light beams. In some embodiments, for depth sensing based on time-of-flight, the controller 360 determines the depth information based on charge stored in one or more accumulators associated with one or more SPAD pixels in the detector of the imaging device 355 over a defined amount of time. In some embodiments, the controller 360 provides the determined depth information to a console (not shown in FIG. 3) and/or an appropriate module of the HMD 110 (e.g., a varifocal module, not shown in FIG. 3). The console and/or the HMD 110 may use the depth information to generate content for presentation on the electronic display of the HMD 110 in various embodiments.

Figure 4:
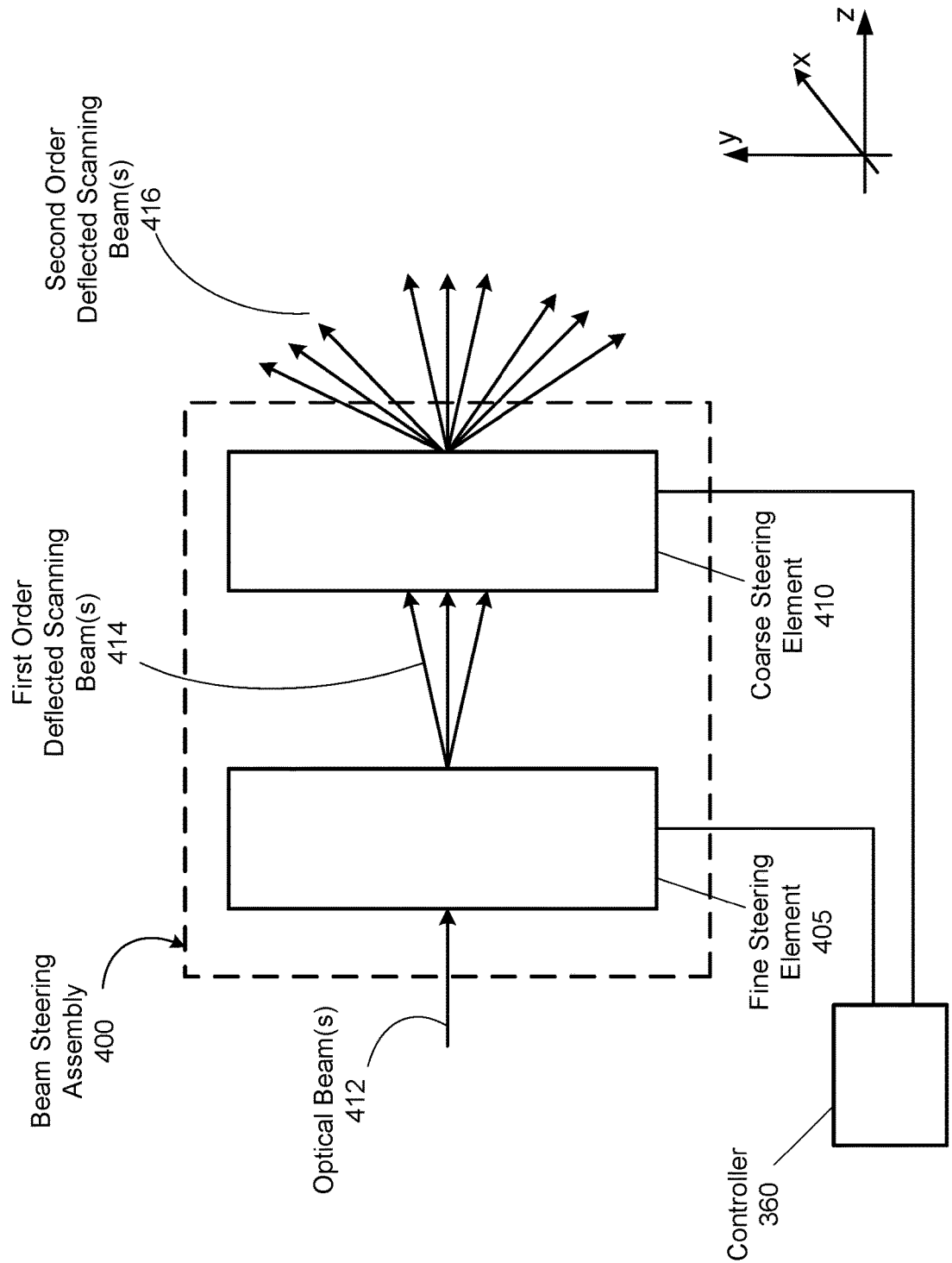
FIG. 4 is a beam steering assembly including a fine steering element and a coarse steering element, which may be integrated into a depth camera assembly (DCA), in accordance with an embodiment.

FIG. 4 illustrates an example beam steering assembly 400, which may be part of the DCA 340 in FIG. 3, in accordance with an embodiment. The beam steering assembly 400 cascades a fine steering element 405 with a coarse steering element 410. The fine steering element 405 deflects one or more optical beams 412 emitted from an illumination source (not shown in FIG. 4) to generate one or more first order deflected scanning beams 414. The fine steering element 405 may be configured to rapidly change a scanning angle of the one or more first order deflected scanning beams 414 over a limited range (e.g., between −10 degrees and +10 degrees), based in part on emission instructions from a controller 360. The fine steering element 405 is thus configured to operate at a high rate and can dwell or step adaptively, e.g., based in part on the emission instructions from the controller 3260. It should be understood that deflection in relation to the fine steering element 405 is a general term that can also refer to other physical effects, such as refraction, reflection or diffraction, depending on an exact physical element used as the fine steering element 405.

In some embodiments, the fine steering element 405 can be implemented based upon one or more acousto-optic devices. In one embodiment, the fine steering element 405 is implemented as an acousto-optic deflector operating in the Bragg regime. In another embodiment, the fine steering element 405 is implemented as a surface acoustic wave (SAW) deflector. In yet another embodiment, the fine steering element 405 is implemented as a thin grating operating in the Raman-Nath regime. As another example, the fine steering element 405 is implemented using one dimensional or two dimensional optical phased array emitters, in which phase delays may be individually introduced for different emitters, allowing control of beam deflection. In general, the fine steering element 405 is configured to function as a dynamic diffraction grating that diffracts the one or more optical beams 412 to form the one or more first order deflected scanning beams 414 based in part on the emission instructions from the controller 360.

The coarse steering element 410 deflects the one or more first order deflected scanning beams 414 to generate one or more second order deflected scanning beams 416 to allow scanning over a large angular range, e.g., between −60 degrees and +60 degrees along both x and y dimensions (horizontal and vertical dimensions). It should be understood that deflection in relation to the coarse steering element 410 is a general term that can also refer to other physical effects, such as refraction, reflection or diffraction, depending on an exact physical element used as the coarse steering element 410. The one or more second order deflected scanning beams 416 represent an embodiment of the one or more light beams 465 emitted by the DCA 340 in FIG. 3. In some embodiments, the one or more second order deflected scanning beams 416 represent structured light having a dot pattern, a line pattern, or any other suitable pattern. By combining the fine steering element 405 providing a small angular spread with the coarse steering element 410 providing a larger angle deviation, the beam steering assembly 400 is flexible in that the one or more generated second order deflected scanning beams 416 can be projected in different areas of a volume. It should be understood that implementation requirements on the combination of fine steering element 405 and coarse steering element 410 may depend on specifications of performance and constraints related to the beam steering assembly 400. One particular implementation method can be chosen over another for different reasons, including ability to reach a particular angular range amplification from the fine steering element 405 to the coarse steering element 410 (e.g., amplification of six times), a switching speed, a power consumption, a size/weight of components of the beam steering assembly 400, etc.

In some embodiments, the coarse steering element 410 covers a wide range of rates. For example, a scanning speed of the coarse steering element 410 varies from matching that of the fine steering element 405 implemented based upon one or more acousto-optic devices (e.g., MHz scanning speed) to sub-kHz scanning speed. In one embodiment, the coarse steering element 410 is implemented based on scanning lenses. In another embodiment, the coarse steering element 410 is implemented as a liquid lens deflector. In yet another embodiment, the coarse steering element 410 is implemented based on polarization grating stacks. Examples of the beam steering assembly are further described in U.S. patent application Ser. No. 15/696,907, filed on Sep. 6, 2017, which is hereby incorporated by reference in its entirety.

Figure 5:
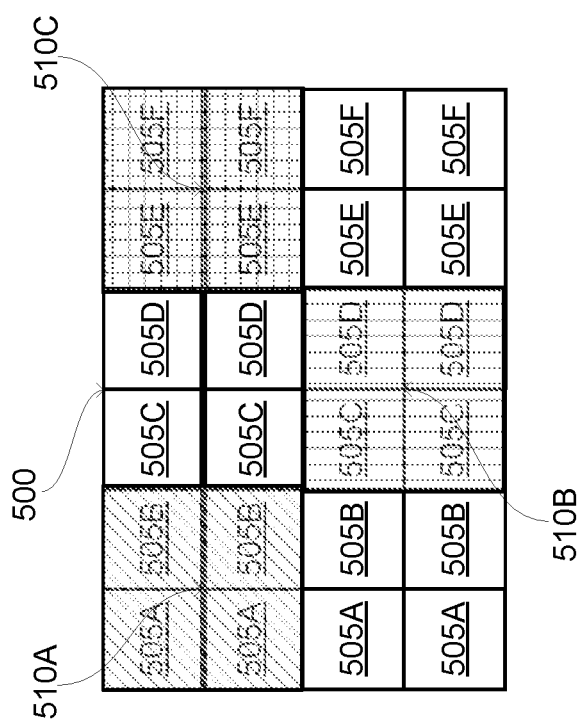
FIG. 5 is an example of a detector of an imaging device of a depth camera assembly (DCA), in accordance with an embodiment.

FIG. 5 illustrates one embodiment of a detector 500 of an imaging device 355 of a depth camera assembly (DCA) 340. In the example shown by FIG. 5, the detector 500 comprises a two-dimensional array of SPAD pixels 505A-F. The array of single photon avalanche diode (SPAD) pixels 505A-F includes different sets 510A, 510B, 510C of SPAD pixels 505A-F corresponding to different regions of the detector 500. In some embodiments, different sets 510A, 510B, 510C may be selected based on one or more signals from the controller 360. Current generated by SPAD pixels 505A-F within a selected set 510A, 510B, 510C may be used to determine depth information for objects without accounting for current generated by SPAD pixels 505A-F that are not within the selected set 510A, 510B, 510C. This allows the controller 360 of the DCA 340 to identify a specific region of the detector 500, so current generated by a set 510A, 510B, 510C corresponding to the specific region from light incident on various SPAD pixels 505A-F of the set 510A, 510B, 510C corresponding to the specific region is summed to generate an analog signal.

Figure 6:
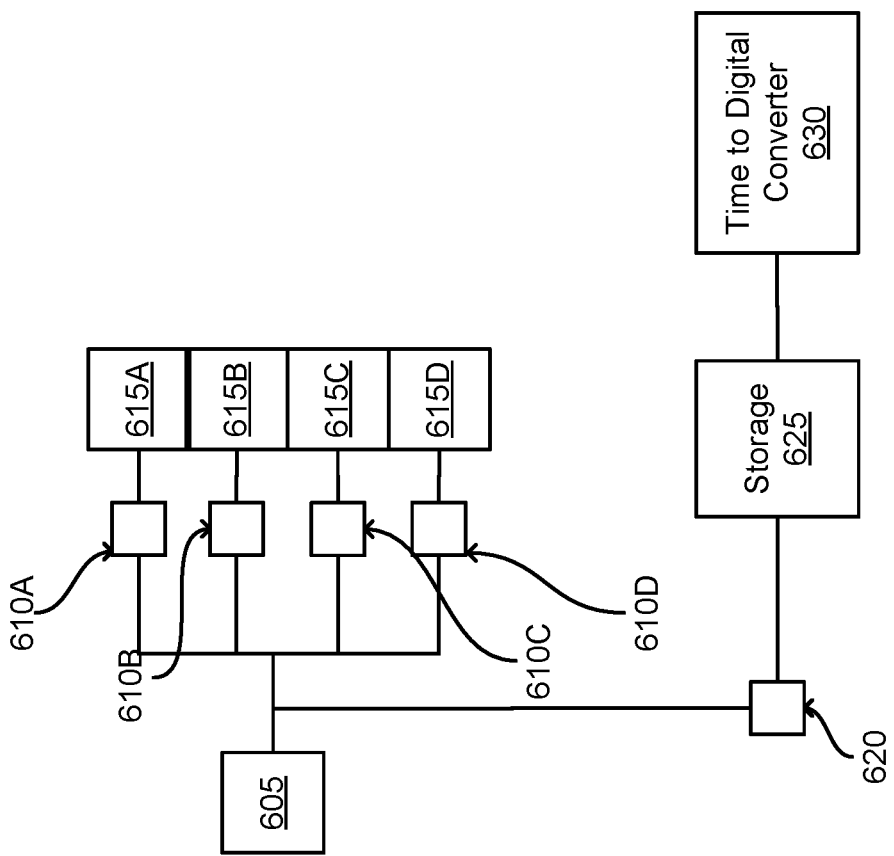
FIG. 6 is an example of a pixel of a detector of a depth camera assembly (DCA) coupled to multiple aggregators via switches activated via one or more control signals, in accordance with an embodiment.

FIG. 6 is a block diagram of one embodiment of a gating configuration for a pixel 605 of depth camera assembly (DCA) detector. While FIG. 6 shows an example gating configuration for a single pixel 605, in other embodiments the gating configuration shown in FIG. 6 is coupled to a set including multiple pixels. In various embodiments, the pixel 605 includes single photon avalanche diode (SPAD). In the embodiment shown by FIG. 6, the pixel 605 is coupled to multiple accumulators 615A, 615B, 615C, 615D (also referred to individually and collectively using reference number 615). While FIG. 6 shows the pixel 605 coupled to four accumulators 615A, 615B, 615C, 615D, in other embodiments the pixel 605 is coupled to any suitable number of accumulators 615; hence, in embodiments other than the example shown in FIG. 6, the pixel 650 may be coupled to different numbers of accumulators 615 via a number of switches 610 corresponding to the number of accumulators 615 than described in conjunction with FIG. 6.

Each accumulator 615A, 615B, 615C, 615D is coupled to the pixel 605 via a corresponding switch 610A, 610B, 610C, 610D (also referred to individually and collectively using reference number 610). In the example of FIG. 6, accumulator 615A is coupled to the pixel 605 via switch 610A, while accumulator 615B is coupled to the pixel 605 via switch 610B. Similarly, accumulator 615C is coupled to the pixel 605 via switch 610C, and accumulator 615D is coupled to the pixel 605 via switch 615D. Hence, different accumulators 615 are coupled to the pixel 605 via different switches 610.

An additional switch 620 is coupled to the pixel 605 and to a storage device 625. The additional switch 620 is also coupled to each of the switches 610 and receives one or more control signals from the controller 340 (not shown). The storage device 625, which is one or more flip-flops or latches in various embodiments stores information describing a state of the additional switch 620. Control signals received by the additional switch 620 are also received by each of the switches 610A, 610B, 610C, 610D to activate or to deactivate switches 610A, 610B, 610C, 610D. In various embodiments, a control signal activates a specific switch 610A, 610B, 610D, 610D to couple the pixel 605 to a specific accumulator 615A, 615B, 615C, 615D coupled to the activated specific switch 610A, 610B, 610D, 610D, while deactivating other switches 610A, 610B, 610D, 610D.

Additionally, a control signal received by the additional switch 620 activates the additional switch 620, coupling the additional switch 620 to a time to digital converter (TDC) 630 via the storage device 625. Current generated by the pixel 605 coupled to an activated switch 610 is aggregated at the aggregator 615 coupled to the pixel 605 via the activated switch 610. The TDC 630 generates a digital representation of a time when the TDC 630 receives current from the pixel 605 via the activated additional switch 620. Thus, the TDC 630 generates a digital timestamp when the TDC 630 obtained current from the pixel 605 via the activated additional switch 620. The TDC 630 is also coupled to the controller 360, which receives the digital timestamp generated by the TDC 630. Based on the digital timestamp from the TDC 630 and a time when the illumination source 350 of the DCA 340 emitted one or more light beams, the controller 360 determines depth information for objects in the local area of the HMD 110 including the DCA 340. In various embodiments, different pixels are coupled to different TDCs 630, or multiple pixels are coupled to a single TDC 630.

In various embodiments, the controller 360 generates the control signals activating a specific switch 610 to couple the pixel 605 to a specific aggregator 615, while decoupling the pixel 605 from other aggregators 615 from individual reconstruction of one or more long exposure images captured by the imaging device. For example, to identify a target location of the detector to obtain depth information by applying a common and sliding, or searching, gate onto the array of pixels 605 comprising the detector. When the controller 360 identifies the target location, the controller 360 communicates one or more control signals to the storage device 625 to activate the additional switch 620, to activate a specific switch 610, and to deactivate other switches 610.

Figure 8:
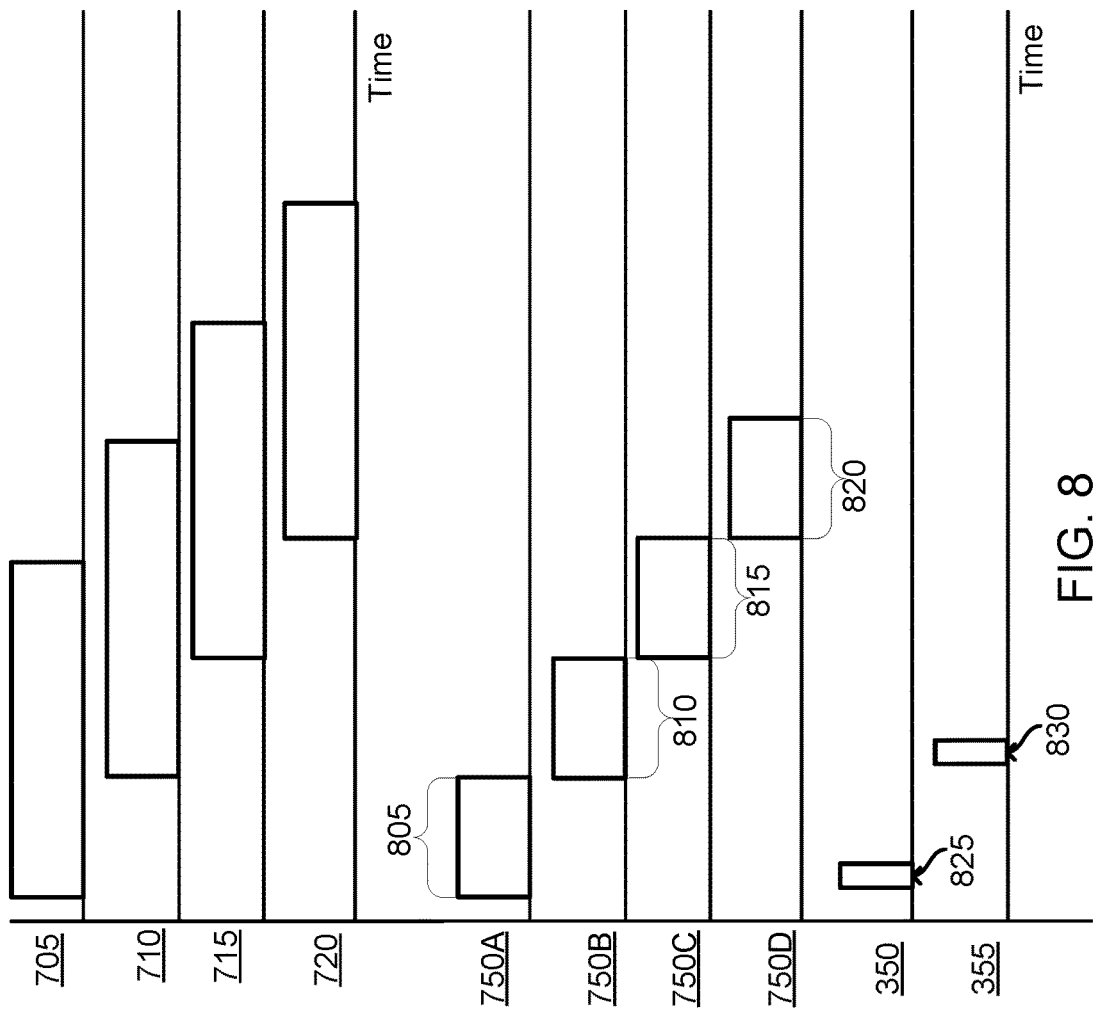
FIG. 8 is a timing diagram of control signals activating switches coupling a pixel to different aggregators generated by the circuitry shown in FIG. 7, in accordance with an embodiment.
Figure 7:
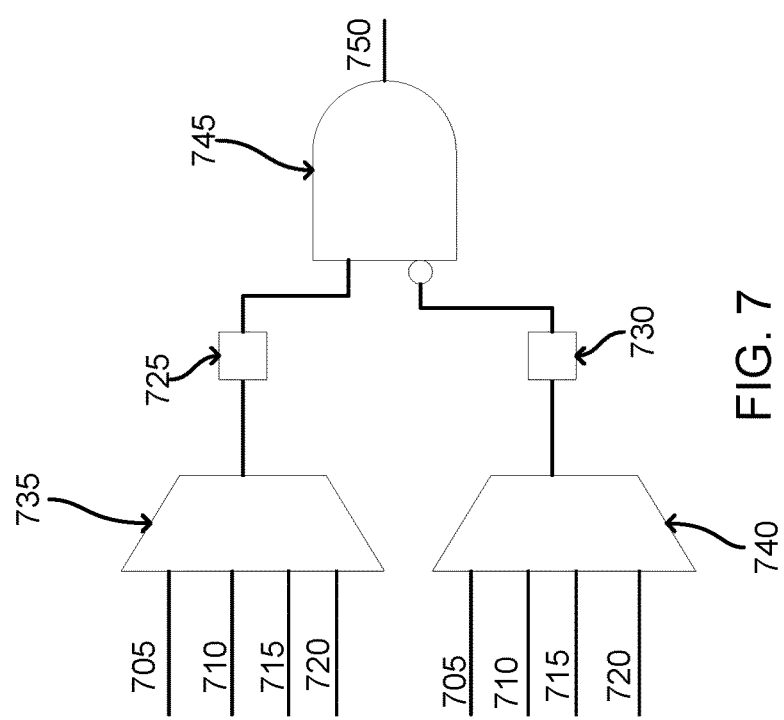
FIG. 7 is a logic diagram of circuitry configured to generate control signals activating switches coupling a pixel to different aggregators, in accordance with an embodiment.

FIGS. 7 and 8 show an example of configuring switches 610 to couple and to decouple a pixel 605 of the detector to one or more aggregators 610. FIG. 7 is a logic diagram of circuitry for generating a control signal 750 that activates a specific switch 610 coupling the pixel 605 to a specific aggregator 615, while decoupling the pixel from other aggregators 615 via other switches 610. In the example of FIG. 7, signals 705, 710, 715, 720 are generated by a delay locked loop (DLL) external to the detector or generated by a frequency multiplier (e.g., a frequency doubler, a frequency quadrupler) included in the detector. In the example of FIG. 7, signals 705, 710, 715, 720 are input into a multiplexer 735 and to an additional multiplexer 740. In the example described in conjunction with FIG. 7, the multiplexer 735 is a 4 to 1 multiplexer that selects one of signals 705, 710, 715, and 720 as output based on a two bit selection signal. Similarly, the multiplexer 740 is a 4 to 1 multiplexer that selects one of signals 705, 710, 715, and 720 as output based on an additional two bit selection signal. However, in other embodiments where different numbers of switches 610 couple the pixel 605 to different numbers of aggregators 615, the multiplexer 740 receives a selection signal having a different number of bits. For example, if the pixel 605 is coupled to 8 accumulators 615 via 8 gates, the multiplexer 740 selects an output based on a three bit selection signal; in another example, if the pixel 605 is coupled to 16 accumulators 615 via 16 gates, the multiplexer 740 selects an output based on a four bit selection signal.

The output of multiplexer 735 is coupled to a timing element 725, while the output of multiplexer 740 is coupled to an additional timing element 730. In one embodiment, timing element 725 delays the output of multiplexer 735 by a specific amount, while additional timing element 730 advances the output of multiplexer 735 by the specific amount. Alternatively, timing element 725 advances the output of multiplexer 735 by the specific amount, while additional timing element 730 delays the output of multiplexer 735 by the specific amount. Including the timing element 725 and the additional timing element 730 when generating the control signal 750 avoids dead zones by introducing an overlap between activation of different switches 610.

In the example of FIG. 7, the output of timing element 725 is coupled to a logical AND gate 745, and the output of additional timing element 730 is inverted and the inverted output of additional timing element 730 is coupled to the logical AND gate 745. In other embodiments, the output of multiplexer 735 is coupled to the logical AND gate 745, while the output of additional multiplexer 740 is inverted, with the inverted output of additional multiplexer 740 coupled to the logical AND gate 745. The logical AND gate 745 outputs the control signal 750 provided to the additional switch 620.

FIG. 8 is a timing diagram of control signals 750 generated by the circuitry further described above in conjunction with FIG. 7. Referring to FIG. 6 as well, control signal 750A activates switch 610A during time interval 805, while switches 610B, 610C, 610D are deactivated during time interval 805. During time interval 810, control signal 750B activates switch 610B, while deactivating switches 610A, 610C, 610D. Control signal 750C activates switch 610C during time interval 815, while deactivating switches 610A, 610B, 610D. Similarly, control signal 750D activates switch 610D during time interval 820, while switches 610A, 610B, 610C are deactivated during time interval 820.

Additionally, the control signal 750 activates the additional switch 620 coupling the pixel 605 in FIG. 6 to the time to digital converter (TDC) 630 when a specific switch 610 is activated, with the controller 360 providing a control signal to the additional gate 620 identifying a specific switch 610, limiting acquisition of timing information by the TDC 630 to the selected switch 610. For example, in FIG. 6, the illumination source 350 emits light during time interval 825, which is reflected by one or more objects in the local area surrounding the DCA 340. The imaging device 355 of the DCA 340 captures the reflected light during time interval 830, as shown in the example of FIG. 8. Hence, the controller 360 determines that aggregator 615B includes the largest amount of current, as time interval 830 is within time interval 810, during which switch 610B is activated to couple the pixel 605 to aggregator 615B. Hence, the controller 360 transmits a control signal to the additional switch 620 to couple the pixel 605 to the TDC 630 during time interval 810, when switch 610B is activated, limiting consumption of resources by the TDC 630 to times when the switch 610 selected by the controller 340 is activated.

Additionally, the configuration described above in conjunction with FIGS. 6-8 allows the detector to generate a coarse histogram describing detection of light by different pixels 605 or groups of pixels based on contents of the accumulators 615A, 615B, 615D, 615C. In various embodiments, the accumulators 615A, 615B, 615D, 615C are each counters that are incremented when the pixel 605 detects light from the local area surrounding the depth camera assembly 340. A histogram identifying different numbers of detections stored by different accumulators 615A, 615B, 615C, 615D coupled to the pixel 605 at different times may be accessed by the controller 360 when selecting a switch 610 corresponding to a time interval when the additional switch 620 is coupled to the TDC 630. Additionally or alternatively, such a histogram may reduce data throughput by using the histogram and intensity measurements to coarsely determine a location of a target in the local area rather than timing information from the TDC 630.

Figure 9:
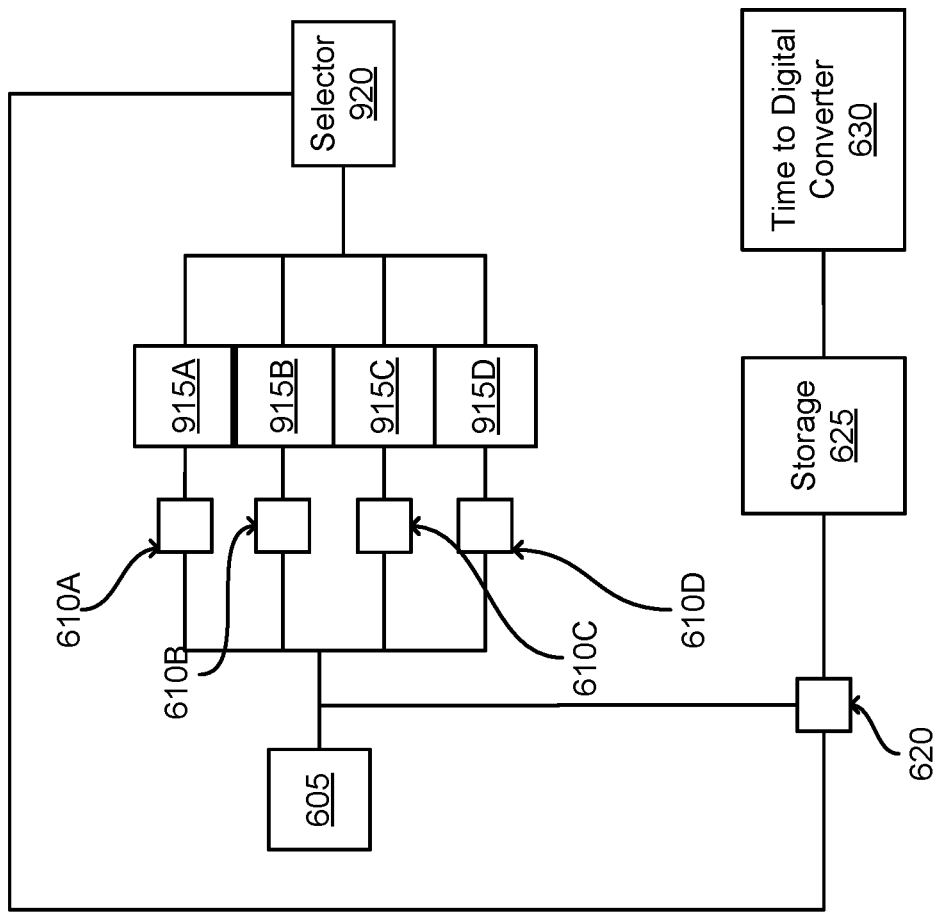
FIG. 9 is an example of an alternative configuration of a pixel of a detector of a depth camera assembly (DCA) coupled to multiple counters via switches activated via one or more control signals, in accordance with an embodiment.

FIG. 9 is a block diagram of an alternative embodiment of a gating configuration for a pixel 605 of a detector of an imaging device 355 of a depth camera assembly (DCA) 340. For purposed of illustration, FIG. 9 shows a configuration for a single pixel 605, while in other embodiments, the gating configuration shown in FIG. 9 is coupled to a set of multiple pixels. In various embodiments, the pixel 605 includes a single photon avalanche diode (SPAD). In the embodiment shown by FIG. 9, the pixel 605 is coupled to multiple counters 915A, 915B, 915C, 915D (also referred to individually and collectively using reference number 915). While FIG. 9 shows the pixel 905 coupled to four counters 915A, 915B, 915C, 915D, in other embodiments the pixel 605 is coupled to any suitable number of counters 915. When the pixel 605 detects a photon from the local area surrounding the DCA 340, a counter 915 coupled to the pixel 605 is incremented.

Each counter 915A, 915B, 915C, 915D is coupled to the pixel 605 via a corresponding switch 610A, 610B, 610C, 610D (also referred to individually and collectively using reference number 610). In the example of FIG. 9, counter 915A is coupled to the pixel 605 via switch 610A, while counter 915B is coupled to the pixel 605 via switch 610B. Similarly, counter 915C is coupled to the pixel 605 via switch 610C, and counter 915D is coupled to the pixel 605 via switch 615D. Hence, different accumulators 915 are coupled to the pixel 605 via different switches 610. A counter 915 coupled to the pixel 605 via an activated switch 610 is incremented when the pixel 605 detects a photon, while other counters 915 coupled to the pixel 605 via deactivated switches 610 are not incremented when the pixel 605 detects a photon. As further described below in conjunction with FIG. 10, different switches 610 are activated at different times, so different counters 915 are incremented when the pixel 605 detects photons during different time intervals.

An additional switch 620 is coupled to the pixel 605 and to a storage device 625. The additional switch 620 is also coupled to each of the switches 610 and is activated when a specific switch 610 is activated. A storage device 625, such as a flip-flop or latch, is coupled to the additional switch 625 and maintains information describing a state of activation and deactivation of various switches 610. To activate or to deactivate the additional switch 625, the detector selects a counter 915 having a maximum value and communicates a control signal to the additional switch 620, so the additional switch 620 is activated when a switch 610 coupling the pixel 605 to the selected counter 915 is activated; hence, the TDC 630 generates a digital representation of a time during a time interval when the selected switch 610 is activated, but not during time intervals when the selected switch 610 is not activated. Based on the digital representation of the time from the TDC 630 and a time when the illumination source 350 of the DCA 340 emitted one or more light beams, the controller 360, which is coupled to the TDC 630 determines depth information for objects in the local area of the HMD 110 including the DCA 340. In the configuration shown by FIG. 9, selection of a switch 610 determining a time interval when the TDC 630 generates a digital representation of a time is performed on the detector itself, allowing a target location within the local area surrounding the HMD 110 for which depth information is determined to be coarsely located at a faster rate and at a lower signal to noise ratio.

A selector 920 is coupled to each of the counters 915 and to the additional switch 620. The selector 920 receives values from each of the counters 915 and includes logic that selects a counter 915 from which a maximum value was received. The selector 920 transmits a control signal to the additional switch 620 based on the selected counter 915 including the maximum value. The control signal from the selector 920 to the additional switch 620 activates the additional switch 620 during a time interval when a switch 610 coupling the pixel 605 to the selected counter 915 from which the maximum value was received. Hence, the selector 920 regulates the time interval when the pixel 605 is coupled to the TDC 630 via the additional switch 620 based on which counter 915 includes a maximum value. Including the selector 920 in the detector of the imaging device 355 allows the imaging device 355 to coarsely locate a target in the local area with a lower signal to noise ratio at a faster rate by leveraging a high dynamic range of the pixel 605, particularly in embodiments where the pixel 605 includes a single photon avalanche diode (SPAD).

Figure 10:
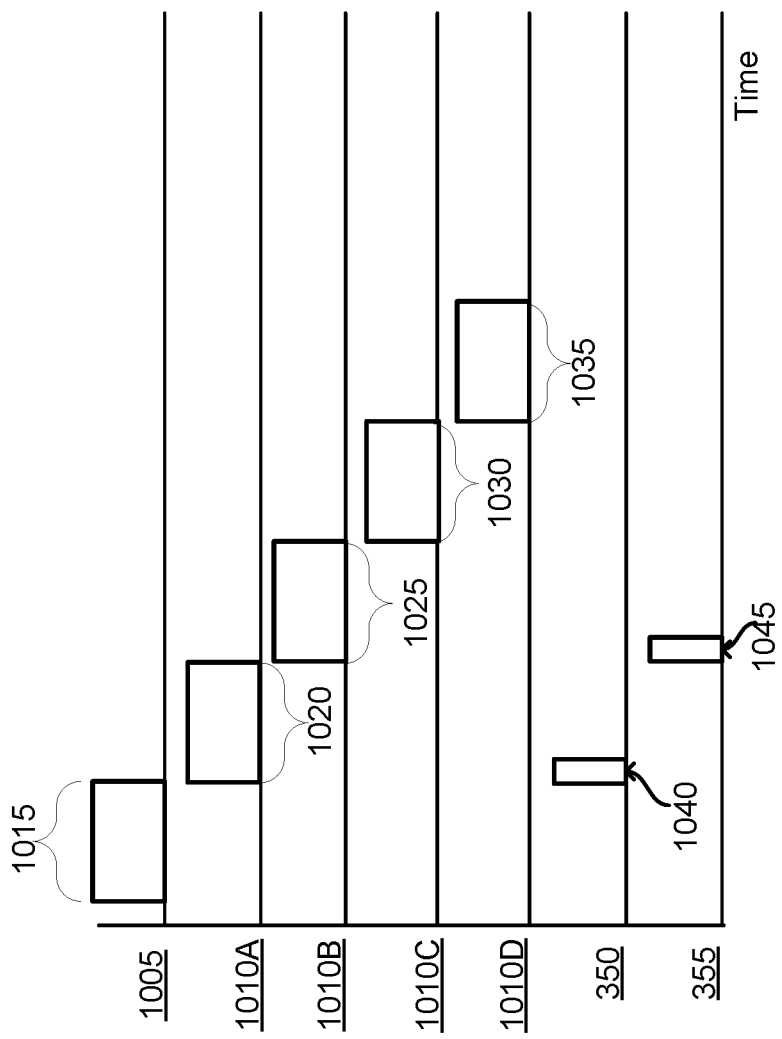
FIG. 10 is a timing diagram of control signals activating switches coupling a pixel to different aggregators generated by the circuitry shown in FIG. 9, in accordance with an embodiment.

FIG. 10 is a timing diagram of control signals generated by the detector to couple different counters 915 to the pixel 605 at different times. Referring to FIG. 9 as well, decrement signal 1005 is communicated to each of the counters 915 during time interval 1015, which is before the illumination source 350 emits light to decrement the counters 915. Decrementing the counters 915 prior to emission of light by the illumination source 350 allows the detector to compensate for background light captured by the imaging device 355.

Control signal 1010A activates switch 610A during time interval 1020, while switches 610B, 610C, 610D are deactivated during time interval 805. During time interval 1025, control signal 1010B activates switch 610B, while deactivating switches 610A, 610C, 610D. Control signal 1010C activates switch 610C during time interval 1030, while deactivating switches 610A, 610B, 610D. Similarly, control signal 1010D activates switch 610D during time interval 1035, while switches 610A, 610B, 610C are deactivated during time interval 1035.

In the example of FIG. 10, the illumination source 350 emits light during time interval 1040. The imaging device 1055 of the DCA 350 detects light emitted by the illumination source 350 and reflected by one or more objects in the local area during time interval 1045. As time interval 1045 is within time interval 1025, during which switch 610B is activated, counter 915B is incremented when the imaging device 1055 detects light emitted by the illumination source 350 and reflected by one or more objects in the local area surrounding the depth camera assembly 340. Hence, different counters 915 are coupled to the pixel 605 and are incremented by photon detections by the pixel 605 during different time intervals.

Figure 11:
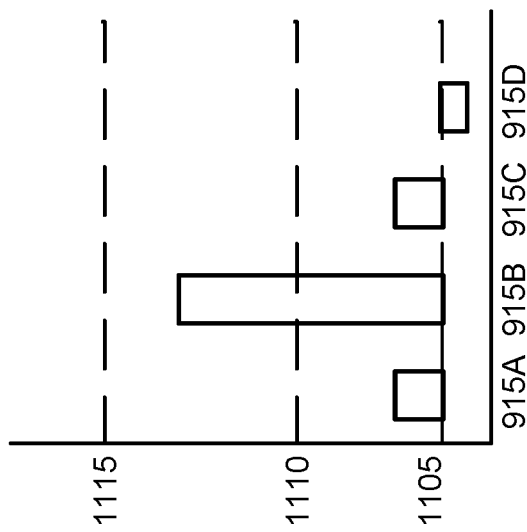
FIG. 11 is an example histogram of values of counters coupled to a pixel of a depth camera assembly (DCA) detector, in accordance with an embodiment.

FIG. 11 shows an example histogram of values of counters 915A, 915B, 915C, 915D at a particular time. In FIG. 11, each counter 915 was initialized to a minimum value 1105 before the illumination source 350 of the DCA 340 emitted light illuminating the local area. In various embodiments, the DCA 340 includes logic that transmits a decrement signal to each counter 915 prior to the illumination source 350 emitting light, and the counters 915 each reset to the minimum value 1105 in response to receiving the decrement signal. As shown in FIG. 11, the minimum value 1105 is a non-zero value in various embodiments. In the example shown by FIG. 11, counter 915B has a maximum value, so the selector 920 selects counter 915B and transmits a control signal to the additional switch 620 that activates the additional switch 620 to couple the pixel 605 to the time to digital converter 630 when switch 610B, which couples the pixel 605 to counter 915B, is activated.

FIG. 11 also shows a maximum value 1115 for each of the counters 915. In various embodiments, each counter 915 comprises a fixed number of bits that is common to each counter 915. For example, each counter 915 is a 9-bit counter. When a counter 915 reaches the maximum value 1115, the counter 915 that reached the maximum value 1115 transmits a signal to the other counters 915 that resets the other counters 915, while the counter 915 that reached the maximum value 1115 resets itself to an intermediate value 1110.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Embodiments of the disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. An imaging device comprising:
   an array of pixels, each pixel of the array of pixels configured to capture light from a local area including portions of light reflected from one or more objects in the local area;
   a plurality of switches coupled to a group of pixels of the array of pixels, each switch activated during a different time interval;
   a plurality of aggregators, each aggregator coupled to a switch of the plurality of switches, an aggregator configured to sum current received from the group of pixels coupled to the aggregator by an activated switch coupled to the aggregator and to the group of pixels; and
   a time to digital converter (TDC) coupled to the group of pixels by an additional switch and configured to generate a digital timestamp signal when the additional switch is activated.

2. The imaging device of claim 1, wherein the imaging device is coupled to a controller, and the controller is configured to provide instructions to the imaging device identifying a specific switch of the plurality of switches.

3. The imaging device of claim 2, wherein the instructions identify a switch of the plurality of switches that is activated when a target location is illuminated by an illumination source.

4. The imaging device of claim 3, wherein the instructions activate the additional switch coupling the TDC to the group of pixels during a time interval when the identified switch is activated.

5. The imaging device of claim 1, wherein a single switch of the plurality of switches is activated during a time interval and other switches of the plurality of switches are deactivated.

6. The imaging device of claim 1, wherein:
   the TDC transmits the digital timestamp to a controller, and
   the controller is configured to determine a distance to an object in the local area from the digital timestamp and a time when an illumination source illuminated the local area.

7. The imaging device of claim 1, wherein the imaging device is coupled to a controller, and the controller is configured to:
   retrieve sums from each of a plurality of accumulators;
   select an accumulator of the plurality of accumulators from which a maximum sum was retrieved; and
   transmit instructions identifying a switch of the plurality of switches that is coupled to the selected accumulator, so the additional switch is activated when the switch coupled to the selected accumulator is activated.

8. The imaging device of claim 1, wherein the imaging device further includes circuitry configured to generate control switches activating different switches coupling a pixel to different accumulators during different time intervals.

9. The imaging device of claim 1, wherein the group of pixels includes a single pixel.

10. The imaging device of claim 1, wherein each pixel includes a single photon avalanche diode (SPAD).

11. An imaging device comprising:
    an array of pixels, each pixel of the array of pixels configured to capture light from a local area including portions of light reflected from one or more objects in the local area;
    a plurality of switches coupled to a group of pixels of the array of pixels, each switch activated during a different time interval;
    a plurality of counters, each counter coupled to a switch of the plurality of switches, a counter configured to increment in response to a pixel of the group of pixels coupled to the counter by an activated switch coupled to the counter and to the group of pixels detecting a photon; and
    a time to digital converter coupled to the group of pixels by an additional switch and configured to generate a digital timestamp signal when the additional switch is activated.

12. The imaging device of claim 11, further comprising:
    a selector coupled to each of the plurality of counters, the selector configured to select a counter having a maximum value.

13. The imaging device of claim 12, wherein the selector is further coupled to the additional switch and configured to activate the additional switch coupling the group of pixels to the time to digital converter during a time interval when a switch coupling the group of pixels to the selected counter is activated.

14. The imaging device of claim 11, wherein each counter comprises a fixed number of bits.

15. The imaging device of claim 14, when the fixed number of bits is common to each counter.

16. The imaging device of claim 11, wherein a counter of the plurality of counters is configured to reset to an intermediate value in response to the counter reaching a maximum value and to transmit a signal to other counters of the plurality of counters that reset the other counters to a minimum value.

17. The imaging device of claim 11, wherein the plurality of counters receive a decrement signal prior to the local area being illuminated with outgoing light and each of the plurality of counters is decremented in response to receiving the decrement signal.

18. The imaging device of claim 11, wherein the group of pixels includes a single pixel.

19. The imaging device of claim 11, wherein each pixel includes a single photon avalanche diode (SPAD).

20. The imaging device of claim 11, wherein the imaging device is coupled to a controller, and the controller is configured to:
 a controller coupled to the imaging device and to an illumination source, the controller configured to receive the digital timestamp from the imaging device and to determine depth information from the digital timestamp and a time when the illumination source emitted outgoing light.

\* \* \* \* \*